United States Patent [19]

Goser et al.

[11] 3,914,857

[45] Oct. 28, 1975

[54] PROCESS FOR THE PRODUCTION OF A CHARGE SHIFT ARRANGEMENT BY A TWO-PHASE TECHNIQUE

[75] Inventors: Karl Goser; Karl-Ulrich Stein, both of Munich, Germany

[73] Assignee: Siemens Aktiengesellschaft, Berlin & Munich, Germany

[22] Filed: Aug. 5, 1974

[21] Appl. No.: 494,708

[30] Foreign Application Priority Data

Aug. 14, 1973 Germany .......................... 2341179

[52] U.S. Cl. ...................................... 29/579; 357/91

[51] Int. Cl.[2] ........................................... B01J 17/00

[58] Field of Search .............. 29/579, 576 B; 357/91

[56] References Cited

UNITED STATES PATENTS

| | | | |
|---|---|---|---|
| 2,875,505 | 3/1959 | Pfann | 29/579 |
| 3,387,360 | 6/1968 | Nakamura | 29/579 |
| 3,829,884 | 8/1974 | Borel | 357/91 |
| 3,851,379 | 12/1974 | Gutknecht | 29/579 |

*Primary Examiner*—W. Tupman

*Attorney, Agent, or Firm*—Hill, Gross, Simpson, Van Santen, Steadman, Chiara & Simpson

[57] ABSTRACT

A two-phase ion implantation process to form a charge coupled device comprising forming an electrically insulating layer on a semiconductor substrate, forming a metal layer on said insulating layer, forming a photo-resist layer on said metal layer, selectively etching areas of the photo-resist layer and the metal layer therebelow to provide spaced electrodes, subjecting the gaps between the electrodes to an ion implantation beam directed at one corner of each gap at a relatively small angle to the plane of the substrate to cause ions to be implanted below one edge region of each electrode, subjecting the gaps to a second ion implantation beam directed at an oblique angle to the substrate which is larger than the angle of said first ion beam to cause ions to be implanted in the substrate beneath each gap but spaced from the edge of the gap which lies opposite to the said one edge, removing the photo-resist layer, forming a second electric insulating layer over the said electrodes and over the bottom and sides of the gaps, forming a second group of electrodes on the second insulating layer over each gap between adjacent electrodes. The ions of the first ion beam are of the same type as are contained in the substrate. The ions of the second beam are of the opposite type to those contained in the substrate. In a preferred embodiment, the ions of the first beam are phosphorus ions, the ions of the second beam are boron ions, and the semiconductor substrate is silicon.

7 Claims, 3 Drawing Figures

PROCESS FOR THE PRODUCTION OF A CHARGE SHIFT ARRANGEMENT BY A TWO-PHASE TECHNIQUE

FIELD OF THE INVENTION

The invention relates to a process for the production of a charge coupled device by a two-phase technique with a substrate consisting of semiconductor material and an electrically insulating layer which is arranged upon said substrate upon which are arranged electrodes, separated from one another by gaps, wherein by two ion implantation processes, an edge zone beneath the electrodes and a sub-zone beneath the gaps are doped in the semiconductor material and wherein the one ion implantation which leads to the doping of the edge zones is carried out in the oblique direction.

Charge coupled devices of this kind are known where the second ion beam is perpendicular to the substrate. For example, the German application laid open for public inspection, OS-2 201 395 describes a charge coupled device in which doping of edge zones beneath one side of each electrode is carried out with an ion beam which is obliquely directed to the surface, and in which the zones beneath the gaps are doped by an ion beam perpendicular to the substrate surface in order to improve the potential course. Such an arrangement of a charge coupled element with electrodes in one plane (one-gate technique) has the advantage that a two-phase operation and a virtually loss-free charge transfer are possible. In such a charge coupled device, the length of a shift stage is determined by the length of two gate electrodes and of two gap zones.

SUMMARY OF THE INVENTION

The present invention provides a process for the production of a charge coupled device by a two-phase technique, in which the area of one shift stage is reduced by half in comparison to the prior art, while maintaining the same electrode widths.

More particularly, the process is characterized by the fact that the second ion implantation process which leads to the doping of the subsidiary zones is also carried out in an oblique direction to the substrate surface, wherein the angle between the direction of the one ion implantation which leads to the doping of the edge zones and the substrate surface is set to be lower than the angle between the direction of the other ion implantation which leads to the doping of the subsidiary zones and the substrate surface. On account of the thickness of the electrodes and the thickness of a photo-resist layer arranged on the electrodes, shading is brought about, which results in leaving undoped zones which provide potential barriers.

A fundamental advantage of the process of the invention lies in the fact that by employing a two-step oblique implantation in charge coupled devices with electrodes in two planes it is possible to produce potential barriers beneath the electrodes of the first plane and also beneath the electrodes of the second plane.

Advantageously, two juxtaposed electrodes, with one electrode being in a first plane and the other electrode being in a second plane, together form a shift stage. In the conventional production technique four juxtaposed gate electrodes are required to form a shift element. As a consequence, with equal widths of the electrodes, the area of a shift stage is reduced by half.

DESCRIPTION OF THE PREFERRED EMBODIMENTS

Figure 1:
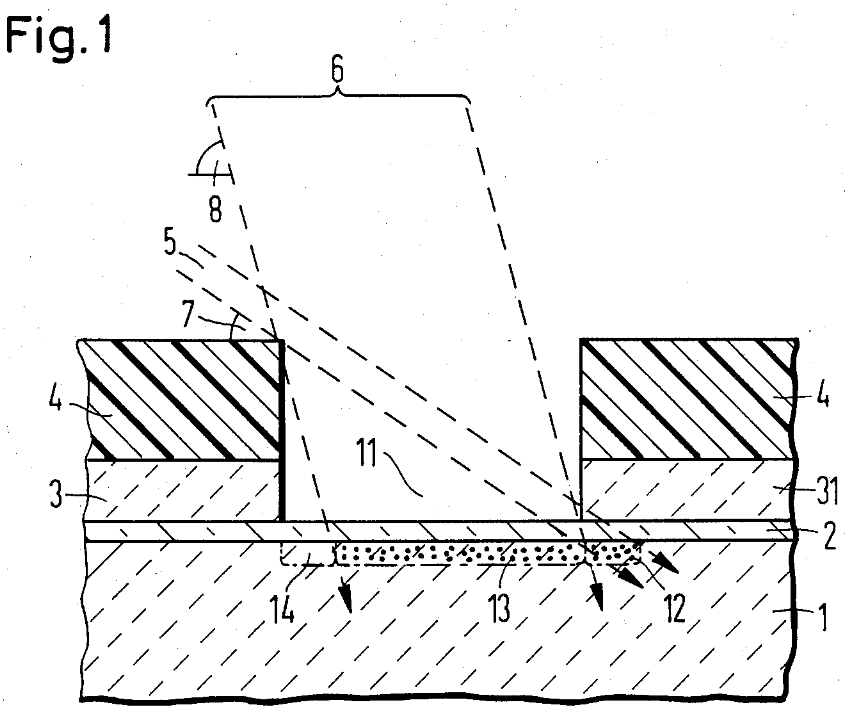
FIG. 1 schematically illustrates a cross-section through a charge coupled device in which doped zones are produced in the semiconductor substrate by means of ion implantation processes in oblique directions.

In FIG. 1, the substrate upon which the charge coupled device is constructed by the process of the invention, is referenced 1. Preferably, this substrate consists of n- or p-conducting silicon.

An electrically insulating layer 2 consisting, for example, of $SiO_2$ is applied to this substrate 1. With the aid of photolithographic process steps, electrodes 3, 31 in a first plane are applied to the electrically insulating layer 2. This is accomplished by forming a photo-resist layer on a metal layer on the insulating layer 2 and then etching areas which form gaps in the photo-resist layer and in the metal layer to leave electrodes 3, 31. These electrodes preferably consist of silicon, molybdenum, aluminum, tungsten or chrome. The residues of the previous photo-resist layer which remain on the electrodes after the etching of the gap 11 between the latter, are referenced 4.

As illustrated in FIG. 1, individual ion implantation steps are now performed during which the edge zones 12 and the subsidiary zones 13 are produced. The doped edge zones which are contained in the substrate 1 and which, as indicated in the drawings, fundamentally lie beneath the edge of the electrodes 31, which faces the ion beam, are referenced 12. An ion beam 5 is irradiated obliquely to the substrate surface to implant ions in the edge zone 12. The angle which the ion beam 5 forms with the substrate surface is indicated at 7.

Ions which are of the same type as the ions contained in the substrate are implanted with the aid of the ion beam 5. In the case of an n-conducting substrate 1, phosphorus ions are implanted into the edge zones 12 and in the case of a p-conducting substrate, boron ions are implanted.

With the aid of an ion beam 6 which is likewise irradiated obliquely to the substrate surface, the subsidiary zone 13 is doped, which lies partly below the gap 11 in the substrate. The angle between the ion beam 6 and the substrate surface is indicated at 8. On account of the thickness of the electrode 3 and the photo-resist layer 4 arranged above it, the oblique irradiation of the ion beam 6 produces a shading at the bottom of the gap so that an undoped zone 14 is left in the substrate 1. This undoped zone 14 produces a potential barrier during the operation of the charge coupled device, as does the doped edge zone 12.

Ions which are of the complementary type to the ions contained in the substrate are implanted with the aid of the ion beam 6. In the case of an n-conducting substrate boron ions are, for example, implanted into the subsidiary zones 13 and in the case of a p-conducting substrate, phosphorus ions are implanted.

Figure 2:
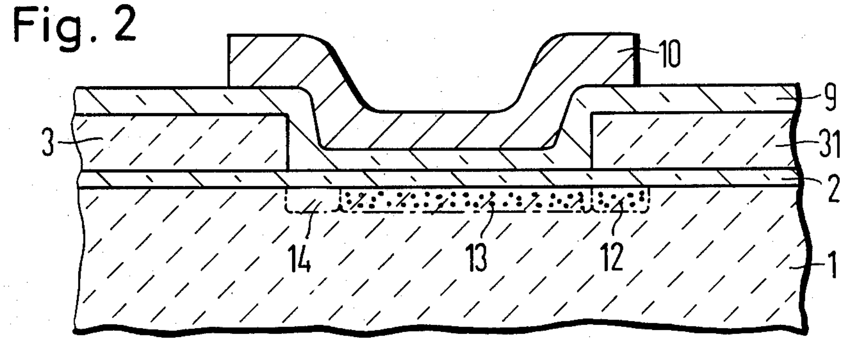
FIG. 2 schematically illustrates a charge coupled device produced by the process of the invention.

In further process steps, as shown in FIG. 2, when the residues 4 of the photo-resist layer have been removed, a further electrically insulating layer 9 is applied to the arrangement in FIG. 1, i.e., to the regions of the substrate surface exposed in the gap 11 and to the surface of the electrodes 3, 31. Preferably, this layer 9 consists, like the layer 2, of silicon dioxide. Now, the electrodes 10 of the second plane are produced upon the layer 9 above the gaps between the electrodes 3, 31 of the first plane. Preferably, these electrodes 10 of the second plane consist of a metal such as aluminum, silicon, tungsten or chrome. For the production of these electrodes of the second plane, preferably a metal layer is first applied to the entire surface of the layer 9, from which, with the aid of known photolithographic process steps, the electrodes 10 of the second plane are then produced.

Figure 3:
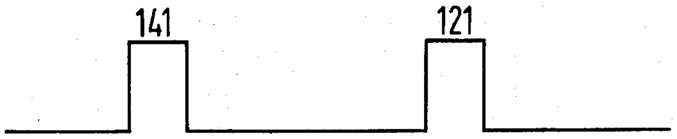
FIG. 3 shows the potential course in a charge coupled device produced by the process of the invention.

FIG. 3 shows the potential course which arises in a charge coupled device produced by the process of the invention, during operation. It can be seen from FIG. 3 that a potential barrier 141 is formed in the zone 14 and a potential barrier 121 is formed in the zone 12.

An essential feature for a two-phase operation is that a potential barrier 14 is also arranged beneath the electrodes of the second plane. If, for example, the ion beam 5 is used to implant phosphorus ions and the beam *y* is used to implant boron ions into an n-conducting silicon substrate 1, then, as can also be seen from FIG. 3, the potential is raised below the electrodes 31 in order to produce potential barriers and is reduced in the implanted gap zones. The reduction here is to such an extent that good transfer properties are achieved.

The potentials in the gap zone can be further adapted to the potentials beneath the electrodes 3 and 31 in that the potentials in the entire gap zone are raised or lowered by a conventional perpendicular implantation. In the non-implanted gap zones 14 the surface potential is not affected and consequently in these zones the potential barriers required for the two-phase operation are formed.

With the aid of charge coupled devices produced by the process of the invention, the length of a shift stage can advantageously be reduced to the length of two electrodes so that the area of a shift stage is only half the size of the area in the known charge shift arrangements featuring electrodes in two planes, of the prior art. Advantageously, the area of a shift stage is only approximately two-thirds of the size of that in the known charge shift arrangements in which electrodes are arranged in only one plane when the gap is approximately half as wide as the electrodes.

This advantage of a greater packing density is decisive for use in storage circuits and in sensors in solid body cameras.

It will be apparent to those skilled in the art that many modifications and variations may be effected without departing from the spirit and scope of the novel concepts of the present invention.

We claim as our invention:

1. A two-phase ion implantation process to form a charge coupled device comprising:

forming an electrically insulating layer on a semiconductor substrate, forming a metal layer on said insulating layer, forming a photo-resist layer on said metal insulating layer, selectively etching areas of the photo-resist layer and the metal layer therebelow to form gaps and to provide a group of spaced electrodes, subjecting the gaps between said electrodes to an ion implantation beam directed at one corner of each gap at a relatively small angle to the plane of the substrate to cause ions to be implanted below one edge region of each electrode, subjecting the gaps to a second ion implantation beam directed at an oblique angle to said substrate which is larger than the angle of said first ion beam to cause ions to be implanted in the substrate beneath each gap but spaced from the edge of the gap which lies opposite to the side of said one edge, removing said photo-resist layer, forming a second electric insulating layer over said electrodes and over the bottom and sides of said gaps, forming a second group of electrodes on the second insulating layer over each gap between adjacent electrodes, the ions of the first ion beam being of the same type as are contained in the substrate, and the ions of the second beam being of the opposite type to those contained in the substrate.

2. A process as set forth in claim 1, in which the ions of said first beam are phosphorus ions, the ions of said second beam are boron ions, and the semiconductor substrate is silicon.

3. A process as set forth in claim 1, wherein said first insulating layer is $SiO_2$.

4. A process as set forth in claim 1, wherein said second electric insulating layer is $SiO_2$.

5. A process as set forth in claim 1, in which said second electric insulating layer is $Al_2O_3$.

6. A process as set forth in claim 1, in which the metal of said first group of electrodes is taken from a group consisting of silicon, molybdenum, aluminum, tungsten and chromium.

7. A process as set forth in claim 1, in which the metal of said second group of electrodes is taken from a group consisting of aluminum, tungsten, silicon and chromium.

* * * * *